(12) United States Patent
Lamberts

(10) Patent No.: US 7,126,778 B2
(45) Date of Patent: Oct. 24, 2006

(54) PROCESS OF DYNAMICALLY ADJUSTING THE OPERATING PARAMETERS OF A COMPUTER STORAGE DEVICE ACCORDING TO ENVIRONMENTAL CONDITIONS

(75) Inventor: Bernd Lamberts, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 960 days.

(21) Appl. No.: 09/777,459

(22) Filed: Feb. 6, 2001

(65) Prior Publication Data

US 2002/0105748 A1 Aug. 8, 2002

(51) Int. Cl.
*G11B 19/02* (2006.01)
*G11B 5/09* (2006.01)

(52) U.S. Cl. .......................... 360/69; 360/46
(58) Field of Classification Search ............... 360/69, 360/46, 75, 68, 31
See application file for complete search history.

(56) References Cited

U.S. PATENT DOCUMENTS

| | | | |
|---|---|---|---|
| 4,479,152 A | 10/1984 | Chi | 360/46 |
| 5,047,876 A | 9/1991 | Genheimer et al. | 360/46 |
| 5,121,262 A | 6/1992 | Squires et al. | 360/46 |
| 5,159,501 A | 10/1992 | Genheimer | 360/45 |
| 5,408,365 A | 4/1995 | Van Doorn et al. | 360/46 |
| 5,455,717 A | 10/1995 | Van Doorn et al. | 360/6 |
| 6,075,664 A * | 6/2000 | Shimizu | 360/46 |
| 6,078,455 A * | 6/2000 | Enarson et al. | 360/68 |
| 6,405,277 B1 * | 6/2002 | Jen et al. | 711/4 |

FOREIGN PATENT DOCUMENTS

| | | |
|---|---|---|
| EP | 0385739 | 9/1990 |
| JP | 09-12102 | 4/1997 |

OTHER PUBLICATIONS

"Write Compensation for Temperature Variation of Head Permeability", IBM Technical Disclosure Bulletin, Feb. 1988, vol. 30 No. 9 pp. 80–81.

* cited by examiner

*Primary Examiner*—Andrew L. Sniezek
(74) *Attorney, Agent, or Firm*—Kunzler & Associates

(57) ABSTRACT

It has been discovered by the inventors that the efficiency and data integrity of a storage device can be improved by dynamically adjusting certain operating parameters to optimal values during the operation of the storage device. In one embodiment, the physical properties of a storage device such as a hard disk drive are measured during the manufacturing process to determine the dependency of the storage device upon the environmental conditions in which the storage device is operating. The physical properties of the storage device and the effect the operating environment of the storage device has upon the storage device performance are determined, and optimal values for the write current of the storage device are stored in a lookup table. The temperature in which the storage device is operating is used as a reference into the data that resides in the lookup table. Optimal values for the precompensation delay may also be stored in the lookup table. During operation of the storage device, the temperature of the operating environment is sensed and used as a reference value into the lookup table. The optimal values of write current and precompensation delay corresponding to the sensed temperature are retrieved, and the write current and precompensation delay of the storage device are adjusted accordingly.

26 Claims, 4 Drawing Sheets

PROCESS OF DYNAMICALLY ADJUSTING THE OPERATING PARAMETERS OF A COMPUTER STORAGE DEVICE ACCORDING TO ENVIRONMENTAL CONDITIONS

BACKGROUND OF THE INVENTION

1. The Field of the Invention

The present invention relates to a method and apparatus for dynamically adjusting the operating parameters of a storage device used for storing computer data. More specifically, the present invention relates to dynamically adjusting the operating parameters of a storage device according to the sensed temperature of the storage device environment.

2. The Relevant Art

Computer systems generally utilize auxiliary memory storage devices having media onto which data can be written and from which data can be read for later use. A direct access storage device (DASD) incorporating rotating magnetic disks is commonly used for storing data in magnetic form on disk surfaces. Data is recorded on concentric, radially spaced tracks on the disk surfaces. Magnetic heads including write elements and read sensors are used to record the data on the disk and then read the data from the tracks on the disk surfaces. The write element and read sensor together are known as the magnetic read/write transducer.

Typically, the read/write transducer is located on a single aerodynamically shaped block of material (usually ceramic). This assembly, also referred to as the slider, flies above the surface of the disk at an extremely small distance (on the order of nanometers) as the disk rotates. The distance the lowest point of the transducer head flies above the disk surface is known to those familiar the art as the mechanical spacing of the DASD.

The write element of the transducer usually consists of an inductive transducing element having an electrical conductor winding around a magnetically permeable material. Data is written by driving a current through the conductor coil to create a magnetic field, causing a magnetic pattern representing the data to be placed on the disk surface. The current that is driven through the conductor coil is known as the write current. This current creates a changing magnetic field exiting the write head structure between the two poles formed by the write gap. The distance between this point (the write gap) and the magnetic center of the disk is known to those familiar with the art as the magnetic spacing of the DASD.

The disks used in current DASDs vary in the required field strength for writing data to them. The dominant factor that limits how easily data can be written to a disk is the coercivity of the disk. The coercivity of the disk refers to the required field strength created by the write head required to permanently change the magnetization direction of the disk. The lower the coercivity of the disk, the easier it is to write data onto the disk surface. Since the write field created by the write head is proportional to the write current under Bertram's theory of magnetic recording, less write current is required to drive the write head at lower coercivity levels.

The mechanical and magnetic spacing properties of a DASD do incur a variety of manufacturing variances (e.g. overcoating thickness, fly high variation, etc.), but once the DASD has been manufactured, for a given set of components, the variations are significantly smaller than over the population of all DASD assemblies. The coercivity of the disk, however, is a dynamic property of the disk drive. The coercivity of the disk is highly sensitive to changes in temperature as well as the flux changes attempted to be written. Current art DASDs do not take the full temperature range of the environment in which the DASD may operate into consideration when setting the write current to be used. This results in either too much or too little write current being applied to record data as the temperature of the environment in which the DASD is operating varies.

When too little write current is used, the written waveform might be substantially distorted or incomplete, leading to errors. When too much write current is applied, large fringe fields may occur at the sides of the write element. The fringe fields may cause a problem known as side writing, or curved transitions, leading to various degradations in the read-back performance. In order for DASDs to optimize storage space, the spacing between the tracks on the disk, or track density, needs to be as small as possible. The presence of fringe fields from too much write current limits the track density of a disk.

Accordingly, a need exists in the art for a dynamic write head current adjustment method and apparatus that is able to set the write current to an optimal value based upon the properties of the DASD and the environment in which the DASD operates.

OBJECTS AND BRIEF SUMMARY OF THE INVENTION

The dynamic write head current adjustment method and apparatus of the present invention has been developed in response to the present state of the art, and in particular, in response to the problems and needs in the art that have not yet been fully solved by currently available dynamic write head current adjustment method and apparatus. Accordingly, it is an overall object of the present invention to provide a dynamic write head current adjustment method and apparatus that overcomes many or all of the above-discussed shortcomings in the art.

To achieve the foregoing object, and in accordance with the invention as embodied and broadly described herein in the preferred embodiment, an improved dynamic write head current adjustment method and apparatus is provided.

The dynamic write head current adjustment method and apparatus of the present invention in one embodiment comprises a storage device evaluation module which is configured to define the properties of a storage device at the time of manufacturing. The storage device evaluation module further comprises an operating parameter determination module and a lookup table generation module that are configured to determine the parameters necessary for optimal operation of the storage device and generate a lookup table which contains the optimal operating parameters respectively. The optimal operating parameters, in lookup table form, are then sent to a storage device controller for storage, as appropriate. The latter can be a ROM lookup table or permanent storage on the storage device itself. The details will depend on the actual implementation and cost considerations for the unit The operations performed by the storage device evaluation module are performed during the manufacturing of the storage device and are performed for each manufactured storage device (optionally for each head disk interface per storage device if required). Alternatively, the operations performed by the storage device evaluation module may be performed one time for a given production run of storage devices, or a given model of storage device. The details will depend on the manufacturing variations as well as time and cost constraints.

The dynamic write head current adjustment apparatus of the present further comprises a storage device optimization module configured to dynamically adjust the operating parameters of the storage device during operation according to the temperature of the storage device operating environment. A temperature sensor is used to sense the temperature of the environment in which the storage device operates. (The temperature sensor can either be a dedicated unit with an A/D converter, or may employ a method to deduce the temperature, such a through VCM coil resistance, as is well known by those of skill in the art). The temperature value is then used to reference the lookup table stored on the storage device.

The optimal operating values for the write current and precompensation delay values for the given temperature are selected from the lookup table, taking into account flux changes. Once the values for the write current and precompensation delay are retrieved from the lookup table, the write current and precompensation delay of the storage device are set to the values found within the lookup table for the sensed temperature.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

It has been discovered by the inventors that the efficiency and data integrity of a storage device can be improved by dynamically adjusting certain operating parameters to their optimal values during the operation of the storage device. In one embodiment, the physical properties of a storage device are measured during the manufacturing process to determine the dependency of the storage device upon the environmental conditions in which the storage device is operating.

Once the physical properties of the storage device and the effect the operating environment of the storage device has upon the storage device performance are determined, optimal values for the write current of the storage device are stored in a lookup table. The temperature at which the storage device is operating is used as a reference into the data that resides in the lookup table. In a further embodiment, optimal values for the precompensation delay are also stored in the lookup table. During operation of the storage device, the temperature of the operating environment is sensed and used as a reference value into the lookup table. The values of write current and precompensation delay that correspond to the sensed temperature are retrieved and the write current and precompensation delay of the storage device are set accordingly.

Figure 1:
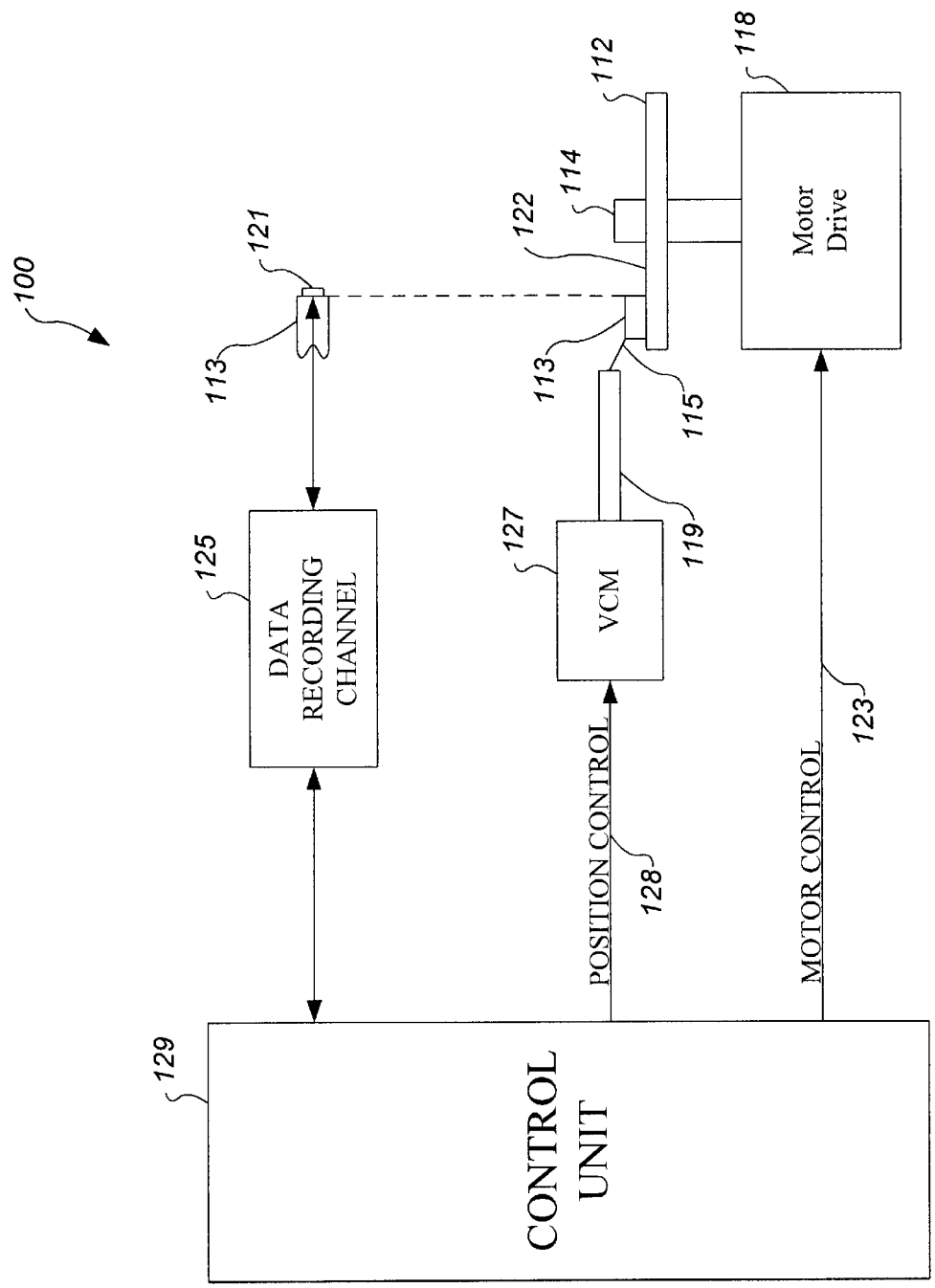
FIG. 1 is a schematic block diagram illustrating one embodiment of a magnetic recording disk drive system for use with the present invention.

FIG. 1 is a schematic block diagram illustrating one embodiment of a magnetic recording disk drive system 100 suitable for use with the present invention. While it is believed that the present invention has utility to many different types of computer storage devices, including tape drives and optical and thermal drives including CD ROM drives, the present invention will be explained herein by way of example with reference to a hard disk drive. The hard disk drive is one type of direct access storage device (DASD) and is representative of storage devices in general. Understanding the present invention in the context of a DASD such as a hard disk drive will make it readily apparent to those skilled in the art how to implement the invention with other types of computer data storage devices.

As shown in FIG. 1, the disk drive 100 system comprises at least one rotatable magnetic disk 112 supported on a spindle 114 and rotated by a disk drive motor 118. The magnetic recording media on each magnetic disk 112 is in the form of an annular pattern of concentric data tracks (not shown).

At least one slider 113 is positioned on the disk 112. Each slider 113 supports one or more magnetic read/write heads 121. As the disks rotate, the slider 113 is moved radially in and out over the disk surface 122 so that the heads 121 may access different portions of the magnetic disk 112. Each slider 113 is attached to an actuator arm 119 by means of a suspension 115. The suspension 115 provides a slight spring force, which biases the slider against the disk surface 122. Each actuator arm 119 is attached to an actuator means 127.

The actuator means 127 as shown in FIG. 1 may be a voice coil motor (VCM). The VCM comprises a coil movable within a fixed magnetic field, the direction and speed of the coil movements being controller by the motor current signals supplied by a controller 129.

During operation of the disk storage system, the rotation of the magnetic disk 112 generates an air bearing between the slider 113 (the surface of the slider 113 which includes the head 121 and faces the surface of the disk 112 is referred to as an air bearing surface (ABS)) and disk surface 122 which exerts an upward force or lift on the slider 113. The air bearing thus counter balances the slight spring force of the suspension 115 and supports the slider 113 off and slightly above the disk surface by a small, substantially constant spacing during normal operation.

The various components of the disk storage system are controlled in operation by control signals, such as access control signals and internal clock signals, generated by the control unit 129. Typically, the control unit comprises logic control circuits, storage means and a microprocessor. The control unit 129 generates control signals to control various system operations such as drive motor control signals on a line 123 and head position and seek control signals on a line 128. The control signals on the line 128 provide the desired current profiles to optimally move and position the slider 113 to the desired track on the disk 112. Read and write signals are communicated to and from the read/write heads 121 by means of a data recording channel 125.

Figure 2:
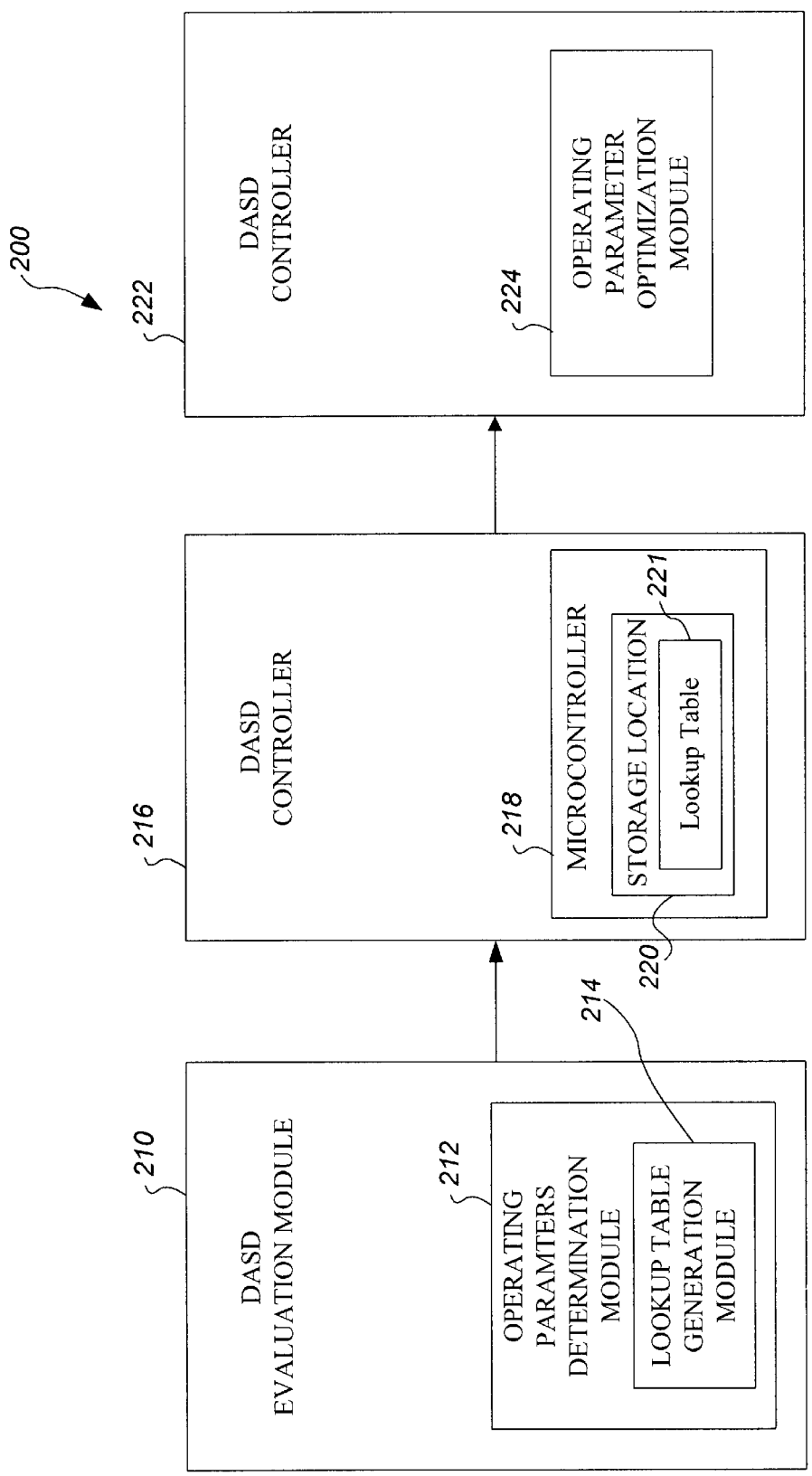
FIG. 2 is a schematic block diagram illustrating one embodiment of a storage device optimization apparatus of the present invention.

The write head 121 of the disk storage system, in one embodiment, comprises an inductive element, such as a coil, that has a current passed through it. This current, known as the write current, creates a magnetic field around the inductive element. The magnetic field of the write head 121 creates a magnetic pattern of the data to be stored and this magnetic pattern is placed upon the disk 112. The field required from the write head 121 to place the magnetic pattern on the disk 112 is governed by the coercivity of the disk 112. Disks that have a high coercivity require the write head 121 to generate a greater magnetic field than disks with low coercivity. The amount of field generated by the write head 121 is determined by the amount of write current passing through the inductive element in the write head. The coercivity of the disk 112 does not remain constant in all environments, and thus, the write current needs to be adjusted according to the environmental operating conditions. FIG. 2 is a schematic block diagram illustrating one embodiment of a direct access storage device (DASD) optimization apparatus 200 of the present invention. The DASD optimization apparatus 200 comprises a DASD evaluation module 210, a DASD controller 216, and a DASD optimization module 222. The DASD optimization apparatus 200 is configured to optimize the performance of a DASD according to the environmental conditions in which the DASD is operating.

The DASD evaluation module 210 is configured to determine and store optimal operating parameters for a range of operating temperatures of the DASD. This is accomplished through the use of an operating parameters determination module 212 and a lookup table generation module 214. The operating parameters determination module 212 is configured to determine the temperature dependency of the DASD. As explained above in relation to FIG. 1, each disk 112 of a DASD has a definite coercivity, which determines, in part, the amount of write current needed to record data on a disk. Other factors that influence the performance of the disk may include, but are not limited to, the magnetic spacing of the disk, the temperature of the environment in which the DASD is operating, the density of the section of the disk that is being written to, the data rate at which the head is writing, the efficiency of the write head, and the actual head geometry.

The above-mentioned factors, or physical parameters of the DASD, are measured during the manufacture process by the DASD evaluation module 210. Once the measurement of these parameters has been taken, the operating parameters determination module 212 creates a temperature dependency model for the DASD. The operating parameters, such as the write current and the precompensation delay, of the DASD are then tested. Using a feedback loop process, the optimal operating values for the operating parameters are found at the temperature of the testing environment. Once the temperature dependency of the DASD and the optimal operating parameters of the DASD have been determined, the temperature of the manufacturing/testing environment is recorded.

The temperature of the manufacturing/testing environment, the experimentally determined optimal operating parameters of the DASD, and the physical parameters of the disk drive are then used by the lookup table generation module 214 to generate a lookup table 221 of optimal operating parameters for the DASD. The lookup table generation module 214 uses the temperature of the testing environment and the optimal operating parameters at that temperature, together with the physical parameters of the DASD, to create a lookup table 221 that contains the optimal operating parameters of the DASD for an operable range of temperatures. The information created and placed in the lookup table by the lookup table generation module 214 is then transferred to the DASD controller 216. The optimal settings for other temperatures may be derived by theoretical calculations based on the recording physics involved. This is possible since the required values are well known entities of physical laws, including coercivity dependency in temperature changes for the disk, calculated in Oe/m degree K. Another example is the coercivity change as a function of write speed, known as dynamic coercivity, which is either an experimental or a theoretical function of the design.

The DASD controller 216 comprises a microcontroller 218, and a storage location 220. The storage location 220 preferably comprises a portion of the random access memory (RAM) utilized by the microcontroller 218 and is used to store the lookup table generated by the lookup table generation module 214.

The DASD optimization module 222 is programmed or otherwise configured to access the information in the lookup table 221 in the storage location 220. The DASD optimization module in one embodiment comprises an operating parameter optimization module 224. The operating parameter module 224 is preferably configured to sense the temperature of the operating environment and to set the operating parameters of the DASD to optimal values for operation.

Figure 3:
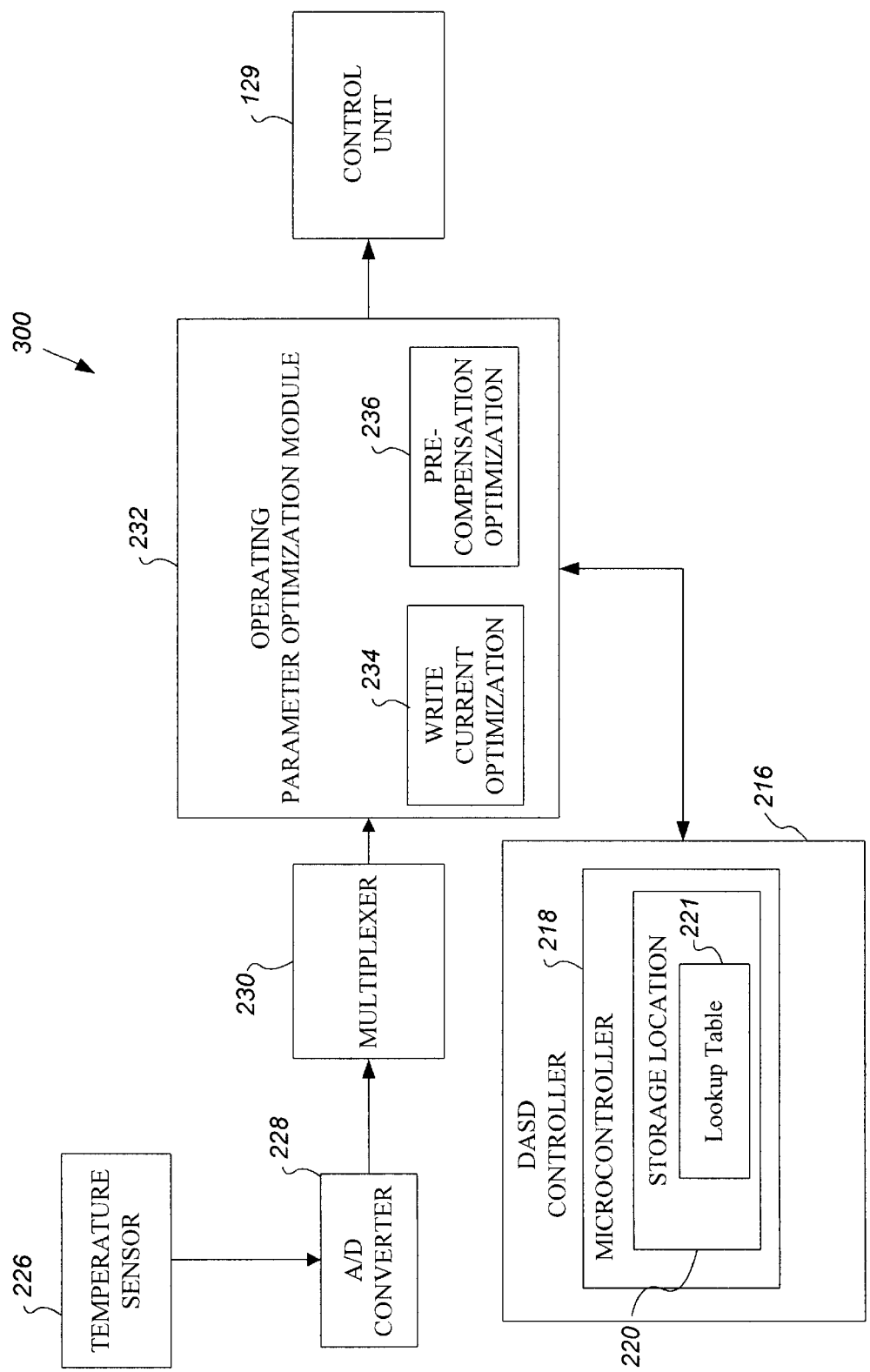
FIG. 3 is a schematic block diagram illustrating one embodiment of a storage device parameter optimization module of the present invention.

FIG. 3 is a schematic block diagram illustrating one embodiment of a DASD operating parameter optimization module 224 of the present invention. The operating parameter optimization module 224 is preferably implemented within a conventional DASD, and in the depicted embodiment comprises a temperature sensor 226, an analog to digital (A/D) converter 228, a multiplexer 230, and an operating parameter selection module 232. The temperature sensor 224 may comprise a third party temperature sensor, and is configured to sense the temperature of the operating environment of the DASD. Alternatively, the coil of the voice coil motor (VCM) 127 of FIG. 1 may be used as a temperature sensor. The conductivity of the wire used in the coil of the VCM varies with the temperature of the coil. Since the amount that the conductivity of the wire changes according to the change in temperature is known, the conductivity of the wire can be measured and the temperature of the operating environment may be derived from that measurement.

The output of the temperature sensor 226 is usually in an analog form and is preferably converted to digital form. In order to accomplish this, the signal obtained from the temperature sensor is processed through an A/D converter 228. The output of the A/D converter 228 is then passed to the operating parameter selection module 232 through the use of a multiplexer 230. It should be noted that the A/D converter, multiplexer, and temperature sensor (in the case where the VCM coil is used to sense the temperature) are standard components within conventional DASDs, and consequently, hardware costs are minimized in implementing the present invention.

The depicted operating parameter selection module 232 further comprises a write current selection module 234, and optionally, a precompensation selection module 236. Once the digital representation of the temperature has been multiplexed into the operating parameter selection module 232, the write current selection module 234 selects the optimal write current for the DASD. The write current selection module 234 is preferably configured to select the optimal write current using the using the sensed temperature as a reference into the lookup table stored in the storage location 220 of the DASD controller 216. The DASD controller 216 returns the write current that corresponds to the sensed temperature.

A similar procedure may be used to select the optimal precompensation delay for the DASD. The precompensation selection module 236 preferably selects the optimal write current by using the sensed temperature as a reference into the lookup table stored in the storage location 220 of the DASD controller 216. The DASD controller 216 returns the write current that corresponds to the sensed temperature. Once the write current selection module 234 and the precompensation selection module 236 have selected the optimal operating parameters, they are sent to the control unit 129 and are used to set the write current and precompensation delay to the optimal values for the operating temperature.

Figure 4:
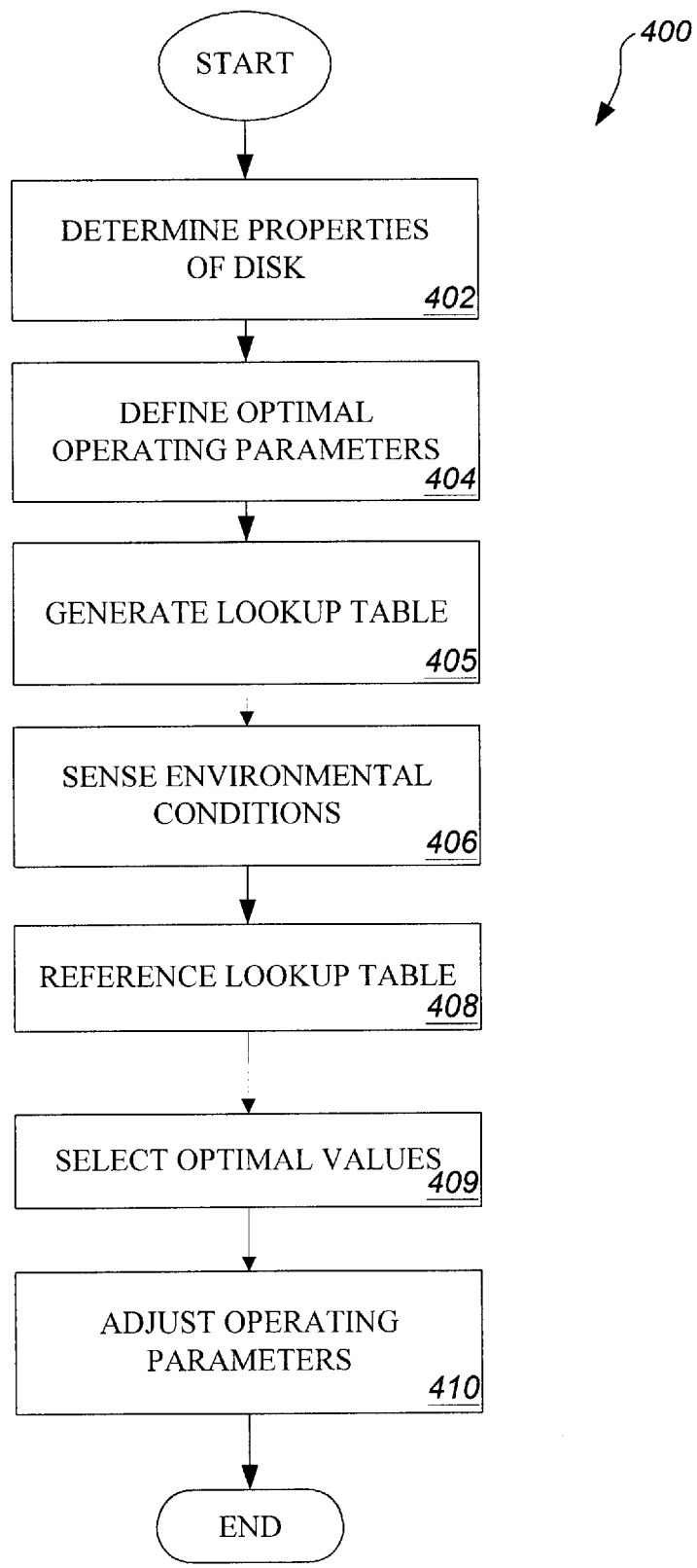
FIG. 4 is a schematic flow chart diagram illustrating one embodiment of a dynamic parameter adjustment method of the present invention.

FIG. 4 is a schematic flow chart diagram illustrating one embodiment of a dynamic parameter adjustment method 400 of the present invention. In a step 402, the physical properties of the DASD are determined. This step is described in detail above with respect to FIG. 1, and comprises determining how the physical properties of the DASD will be effected by the operating environment of the DASD. In a step 404, the optimal operating parameters for the DASD are defined. This preferably comprises evaluating the physical properties of the DASD as determined in the step 402, and defining the optimal operating parameters for the DASD.

Once the optimal operating parameters have been defined in the step 404, a lookup table 221 (of FIG. 3) containing the optimal operating parameters is generated in a step 405. The lookup table 221 contains the optimal operating parameters for the write current and, optionally, the precompensation delay for the DASD. The data in the lookup table 221 is referenced by temperature values. The steps 402, 404, and 405 are performed one time per DASD and are performed when the DASD is manufactured. Alternatively, the steps 402, 404 and 405 are performed one time per DASD production run, or one time per model type of DASD and the values obtained are applied to all the DASDs in the production run or model type.

In a step 406, the temperature of the DASD is sensed. The sensed temperature is used to reference the lookup table 221 in a step 408. The operating parameters corresponding to the sensed temperature are selected from the lookup table 221 in a step 409. Once the operating parameters have been selected from the lookup table 221 in the step 409, the operating parameters are used to adjust the write current and the precompensation delay of the DASD in a step 410.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for dynamically adjusting operating parameters of a storage device according to environmental conditions of the storage device, the method comprising:

evaluating a dynamic coercivity of the storage device during manufacturing of the storage device to determine optimal operating parameters of the storage device;

storing the optimal operating parameters;

sensing environmental conditions of the storage device during operation of the storage device; and adjusting the operating parameters of the storage device according to the sensed environmental conditions and the optimal operating parameters.

2. The method of claim 1, wherein evaluating the dynamic coercivity of the storage device during manufacturing of the storage device to determine optimal operating parameters of the storage device further comprises evaluating the dynamic coercivity of the storage device to determine a measure of temperature dependence of the storage device.

3. The method of claim 2, wherein evaluating the dynamic coercivity of the storage device during manufacturing to determine optimal operating parameters of the storage device further comprises generating a lookup table of optimal operating parameters of the storage device.

4. The method of claim 3, wherein generating a lookup table of optimal operating parameters of the storage device further comprises correlating optimal operating parameter values to a temperature.

5. The method of claim 4, wherein the controller comprises a hard disk controller (HDC) and wherein storing the storage device optimal operating parameters within the controller further comprises storing the lookup table in a microcontroller of the HDC.

6. The method of claim 1, wherein adjusting the operating parameters of the storage device according to the environmental conditions further comprises sensing the temperature of the storage device environment.

7. The method of claim 6, wherein adjusting the storage device operating parameters according to the environmental conditions further comprises referencing a lookup table to determine the optimal write current for the sensed temperature.

8. The method of claim 7, wherein adjusting the storage device operating parameters according to the environmental conditions further comprises setting the write current to the value obtained through referencing the lookup table.

9. The method of claim 6, wherein adjusting the operating parameters of the storage device according to the sensed environmental conditions further comprises referencing a lookup table to determine the optimal precompensation delay for the sensed temperature.

10. The method of claim 7, wherein adjusting the storage device operating parameters according to the environmental conditions further comprises setting a precompensation delay to the value obtained through referencing the lookup table.

11. The method of claim 1, further comprising adjusting the write current of the write head of a direct access storage device (storage device) according to environmental conditions without adding additional hardware to the storage device.

12. A method of dynamically adjusting the operating parameters of a direct access storage device (storage device) according to environmental conditions of the storage device, the method comprising:

evaluating a dynamic coercivity of the storage device during manufacturing of the storage device to determine the optimal operating parameters of the storage device;

generating a lookup table that contains the optimal operating parameters of the storage device for a range of temperatures storing the optimal operating parameters within a controller of the storage device, the controller of the storage device comprising a hard disk controller (HDC) having a microcontroller in which the lookup table is stored;

sensing the temperature of the storage device environment during the operation of the storage device;

referencing the lookup table to determine the optimal write current for the sensed temperature;

setting the write current to the value obtained through referencing the lookup table;

referencing the lookup table to determine the optimal precompensation delay for the sensed temperature; and setting the precompensation delay to the value obtained through referencing the lookup table.

13. An apparatus for dynamically adjusting the operating parameters of a direct access storage device (storage device) according to environmental conditions of the storage device, the apparatus comprising:

a storage device evaluation module configured to evaluate a dynamic coercivity of the storage device during manufacturing of the storage device to determine the optimal operating parameters of the storage device;

a storage location configured to store the optimal operation parameters within a controller of the storage device;

a temperature sensor configured to sense the temperature of the storage device environment during operation of the storage device; and an operating parameter adjustment module configured to adjust the operating parameters of the storage device according to the temperature sensed by the temperature sensor and the optimal operating parameters.

14. The apparatus of claim 13, wherein the storage device evaluation module configured to evaluate the dynamic coercivity of the storage device during manufacturing of the storage device to determine the optimal operating parameters of the storage device further comprises an operating parameter optimization module configured to evaluate the dynamic coercivity of the storage device to determine the temperature dependence of the storage device.

15. The apparatus of claim 13, wherein the storage device evaluation module configured to evaluate the dynamic coercivity of the storage device during manufacturing of the storage device to determine the optimal operating parameters of the storage device further comprises a lookup table generation module configured to generate a lookup table of the optimal operating parameters of the storage device.

16. The apparatus of claim 13, wherein the storage device evaluation module configured to evaluate the storage device during manufacturing of the storage device to determine the optimal operating parameters of the storage device further comprises a operating parameter/temperature correlation module configured to correlate each of the optimal operating parameter values to a temperature.

17. The apparatus of claim 13, wherein the storage location configured to store the optimal operation parameters within a controller of the storage device comprises a hard disk controller (HDC).

18. The apparatus of claim 17, wherein the storage location configured to store the optimal operation parameters within a controller of the storage device further comprises storage space on a microcontroller of the HDC.

19. The apparatus of claim 18, wherein the optimal operating parameters are stored in a lookup table.

20. The apparatus of claim 19, wherein the operating parameter adjustment module configured to adjust the operating parameters of the storage device according to the temperature sensed by the temperature sensor and the optimal operating parameters is further configured to reference the lookup table to determine the optimal write current for the sensed temperature.

21. The apparatus of claim 20, wherein the operating parameter adjustment module configured to adjust the operating parameters of the storage device according to the temperature sensed by the temperature sensor and the optimal operating parameters is further configured to set the write current to the value obtained through referencing the lookup table.

22. The apparatus of claim 19, wherein the operating parameter adjustment module configured to adjust the operating parameters of the storage device according to the temperature sensed by the temperature sensor and the optimal operating parameters is further configured to reference the lookup table to determine the optimal precompensation delay for the sensed temperature.

23. The apparatus of claim 22, wherein the operating parameter adjustment module configured to adjust the operating parameters of the storage device according to the temperature sensed by the temperature sensor and the optimal operating parameters is further configured to set the precompensation delay to the value obtained through referencing the lookup table.

24. The apparatus of claim 13, wherein the temperature sensor configured to sense the temperature of the storage device environment comprises the coil of the voice coil motor of the HDC.

25. The apparatus of claim 13, wherein the temperature sensor configured to sense the temperature of the storage device environment comprises a separate, third party temperature sensor element.

26. The apparatus of claim 13, wherein the analog signal received from the temperature sensor is converted to a digital signal through the use of a preexisting analog to digital converter.

* * * * *